United States Patent
Birge et al.

(10) Patent No.: US 7,154,667 B2
(45) Date of Patent: Dec. 26, 2006

(54) BIREFRINGENT NETWORKS

(75) Inventors: Jonathan R. Birge, Cambridge, MA (US); Gary D. Sharp, Boulder, CO (US)

(73) Assignee: ColorLink, Inc., Boulder, CO (US)

( * ) Notice: Subject to any disclaimer, the term of this patent is extended or adjusted under 35 U.S.C. 154(b) by 114 days.

(21) Appl. No.: 10/653,345

(22) Filed: Sep. 2, 2003

(65) Prior Publication Data
US 2004/0042077 A1    Mar. 4, 2004

Related U.S. Application Data

(60) Provisional application No. 60/407,033, filed on Aug. 30, 2002.

(51) Int. Cl.
*G02B 5/30*   (2006.01)

(52) U.S. Cl. ............... 359/485; 359/496; 359/499

(58) Field of Classification Search ........... 359/498, 359/499, 496, 494; 398/122, 128; 385/11
See application file for complete search history.

(56) References Cited

U.S. PATENT DOCUMENTS 6,166,838 A * 12/2000 Liu et al. .................. 398/1

* cited by examiner

*Primary Examiner*—Fayez G. Assaf
(74) *Attorney, Agent, or Firm*—Baker & McKenzie LLP

(57) ABSTRACT

A birefringent network can be formed from a pair of beam directing elements that sandwich a birefringent filter. One of the beam director elements can be a polarizing beam splitter and the other of the beam director elements can be a reflector or polarizing beam splitter. The polarizing beam splitters can be formed by an anisotropic material sandwiched between two isotropic pieces and can include optical films to couple both polarizations of light into and out of the beam splitters. The polarizing beam splitters also can be formed by anisotropic material on either side of an isotropic bow-tie piece, all of which is sandwiched a pair of isotropic pieces. A birefringent network also can be formed by a pair of bulk birefringent beam splitters sandwiching a birefringent filter. Little or no polarization mode dispersion occurs in these birefringent networks since all of the beams travel the same distances through the same elements.

29 Claims, 14 Drawing Sheets

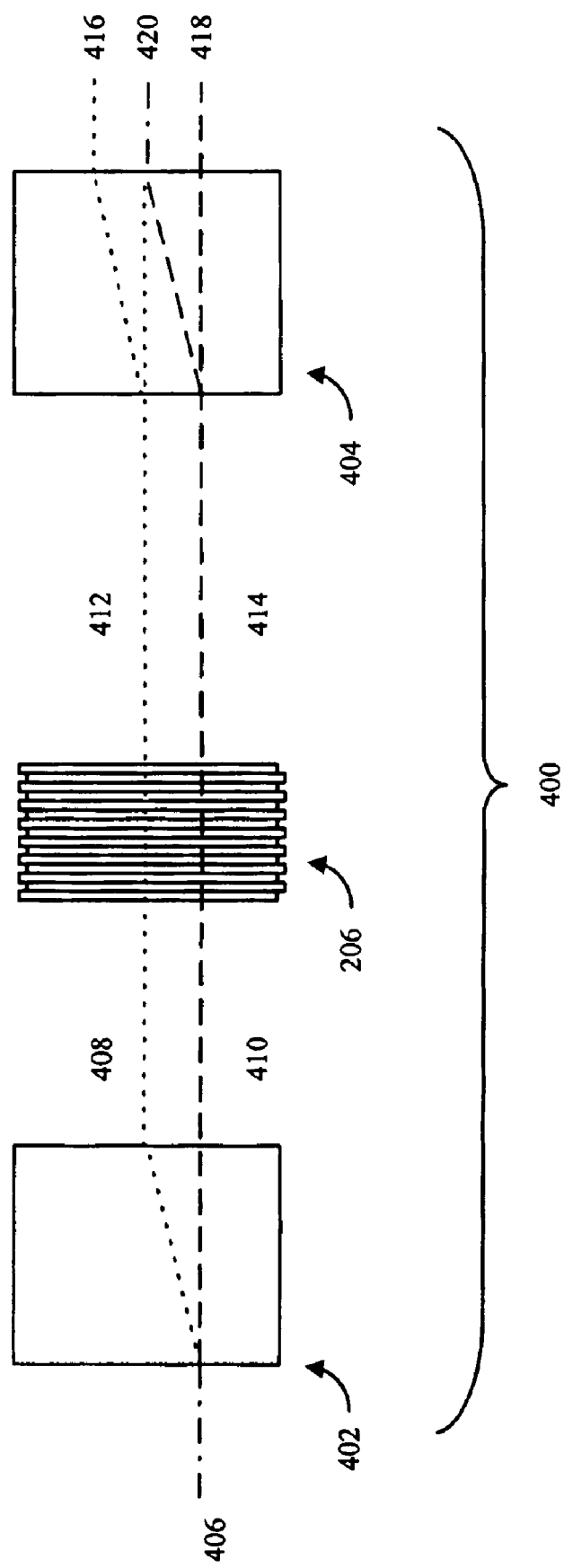

BIREFRINGENT NETWORKS

PRIORITY CLAIM AND RELATED APPLICATIONS

The present application claims priority from U.S. Provisional Application entitled "Birefringent Networks," Ser. No. 60/407,033 filed Aug. 30, 2002, having Jonathan R. Birge and Gary D. Sharp, as inventors, and having as assignee ColorLink, Inc., the assignee of the present application. This provisional application is incorporated herein by reference in its entirety for all purposes.

FIELD OF THE INVENTION

The present invention relates generally to optical filters, their use and manufacture, and more particularly to birefringent networks having beam splitters and birefringent filters, their use and manufacture.

BACKGROUND

Optical filters can be advantageously combined with various technologies. One such area is telecommunications. Telecommunication optical filters typically require minimal insertion loss and polarization dependent loss (PDL). Various polarization diversity techniques have been employed to achieve minimal insertion loss and PDL for birefringent filters.

Polarization diversity techniques split the light input into the optical filter into its orthogonal components for filtering. The filtered light may then be recombined and output as an unpolarized beam.

Some prior art polarization diversity techniques have used cube polarization beam splitters to split the input light and to recombine the filtered light. Unfortunately, cube polarization beam splitters have large beam spacing, must be precisely aligned, and do not always provide high extinction ratios.

Other prior art polarization diversity techniques have used walk-off configurations with expensive bulk birefringent materials such as calcite or yttrium vannadate. The walk-off configurations require complex optical paths when using both outputs in a polarization insensitive manner. This results in an expensive and complex architecture.

Polarization mode dispersion (PMD) has become increasingly important as optical data rates have increased. Complex architectures have additional delay symmetry elements to compensate for PMD. Simpler architecture can also compensate for PMD. The simpler architecture requires the use of extra compensating elements of precise thickness. Unfortunately, the asymmetric architecture of these PMD compensated devices renders them sensitive to temperature changes.

Accordingly, there is a strong need for an inexpensive optical filter with a small beam spacing and simple optical path that has little or negligible PMD.

SUMMARY OF THE INVENTION

An aspect of the invention is to provide a birefringent network including a first beam director that redirects light into a first path and a second path, a second director that receives light directed along the first and second paths, and a birefringent filter between the first and second beam directors that filters the light which traverses along the first and second paths. The length of the first path is substantially equal to the length of the second path, and the optical length of the first path is substantially equal to the optical length of the second path.

Another aspect of the invention is to provide a birefringent network including a first beam director that redirects light into a first path and a second path, the first beam director including an isotropic/anisotropic planar interface that transmits light of one polarization and reflects light of an orthogonal polarization, a second beam director that receives light directed along the first and second paths; and a birefringent filter between the first and second beam directors that filters the light which traverses along the first and second paths. The first and second paths from the isotropic/anisotropic planar interface to the second director are symmetric about the isotropic/anisotropic planar interface.

Another aspect of the invention is to provide a film for coupling plural polarization components of incident light between two media having different refractive indices including a media, and a film located at a surface of the media. The film couples at least two predetermined orthogonal polarization components of an acute incident light into the media.

Another aspect of the invention is to provide a beam director including first and second isotropic media sandwiching an anisotropic media along a sandwiching direction. The light input into and output from the beam director are parallel to the sandwiching direction.

Another aspect of the invention is to provide a method of affecting light with a birefringent network including redirecting light into a first path and a second path with a first beam director, receiving light directed along the first and second paths into a second director, and filtering the light which traverses along the first and second paths that is between the first and second beam directors with a birefringent filter. The length of the first path is substantially equal to the length of the second path, and the optical length of the first path is substantially equal to the optical length of the second path.

Another aspect of the invention is to provide a method of affecting light with a birefringent network including redirecting light into a first path and a second path with a first beam director, the first beam director including an isotropic/anisotropic planar interface that transmits light of one polarization and reflects light of an orthogonal polarization, receiving light directed along the first and second paths with a second beam director, and filtering the light which traverses along the first and second paths between the first and second beam directors with a birefringent filter. The first and second paths from the isotropic/anisotropic planar interface to the second director are symmetric about the isotropic/anisotropic planar interface.

Another aspect of the invention is to provide a method for coupling plural polarization components of incident light between two media having different refractive indices with a film including providing a media, and forming a film located at a surface of the media such that the film couples at least two predetermined orthogonal polarization components of an acute incident light into the media.

Another aspect of the invention is to provide a method of affecting light with a beam director including providing first and second isotropic media sandwiching an anisotropic media along a sandwiching direction, inputting input light in a direction parallel to the sandwiching direction, and outputting output light in a direction parallel to the sandwiching direction.

Another aspect of the invention is to provide a method of affecting light with a birefringent network including providing a first and second bulk birefringent beam splitter, separating input light into a first light beam and a second light beam with the first bulk birefringent beam splitter, filtering the first and second light beams with a birefringent filter sandwiched between the first and second bulk birefringent beam splitters, separating the filtered first light beams into third and fourth light beams with the second bulk birefringent beam splitter, separating the filtered second light beam into fifth and sixth light beams with the second bulk birefringent beam splitter, combining the fourth and fifth light beams into a combined beam. The third and sixth light beams are polarized light beams, and the combined light beam is an unpolarized light beam.

BRIEF DESCRIPTION OF THE DRAWINGS

FIG. 15 shows a walk-off configured birefringent network.

DETAILED DESCRIPTION

Figure 1:
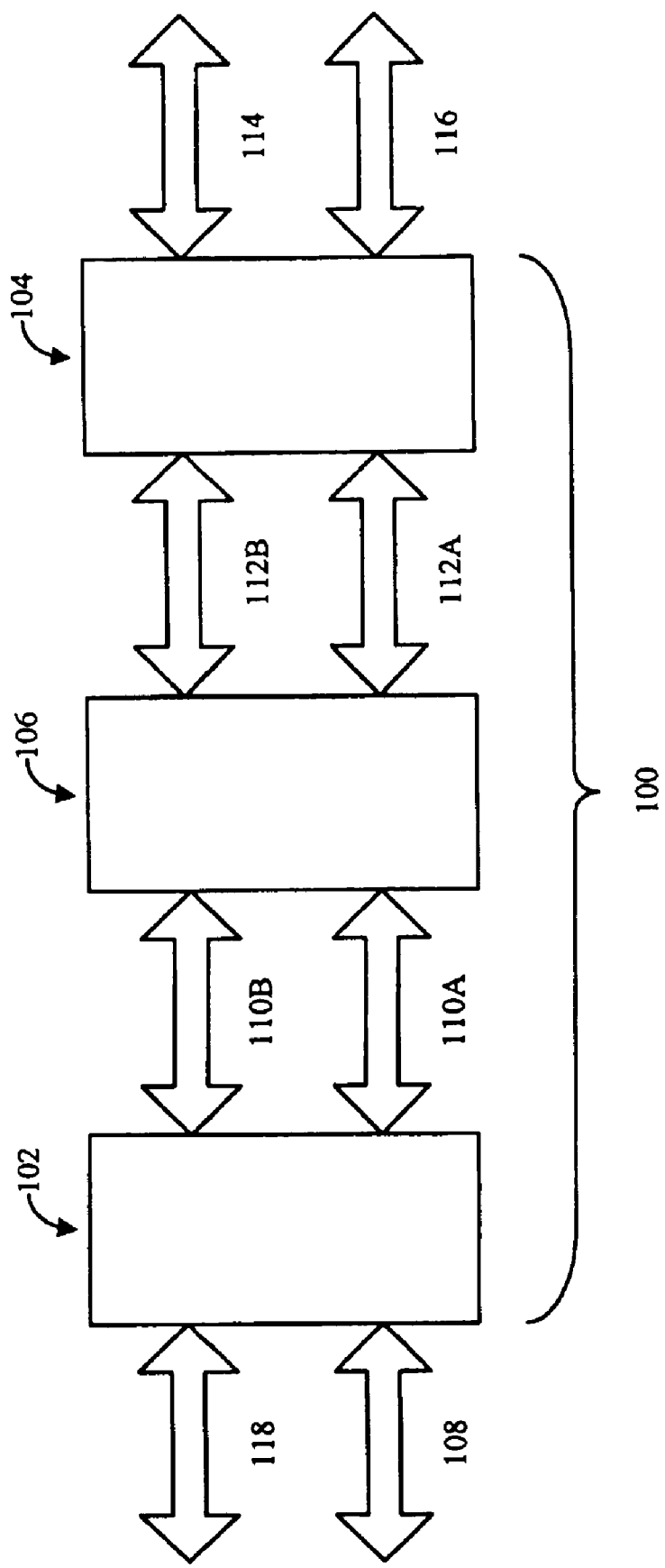
FIG. 1 shows a block diagram of a birefringent network.

FIG. 1 shows a block diagram of a birefringent network 100. A first beam director 102, a second beam director 104 and a birefringent filter 106 are the three basic components that form the birefringent network 100. An unpolarized light beam 108 is separated into two orthogonally polarized light beams 110A, 110B by the first beam director 102. The two orthogonally polarized light beams 110A, 110B then are filtered by the birefringent filter 106 to produce two filtered light beams 112A, 112B. The filtered light beams 112A, 112B are then input into the second beam director 104. The second beam director 104 causes one or both of the filtered light beams 112A, 112B to be directed into a first output beam 114 or second output beam 116, or to be directed back towards the birefringent filter 106. Optionally, another unpolarized light beam 118 may also be input into the birefringent network 100. This another unpolarized light beam 118 will be processed in a manner similar to that of the unpolarized light beam 108. Where the unpolarized light beams 108, 118 are directed is determined by the configuration of the birefringent network 100, the characteristics of the unpolarized light beams 108, 118 input into the birefringent network 100 and the point of entry for the unpolarized light beams 108, 118. The birefringent filter 106 may be any appropriate kind of birefringent filter.

Figure 2:
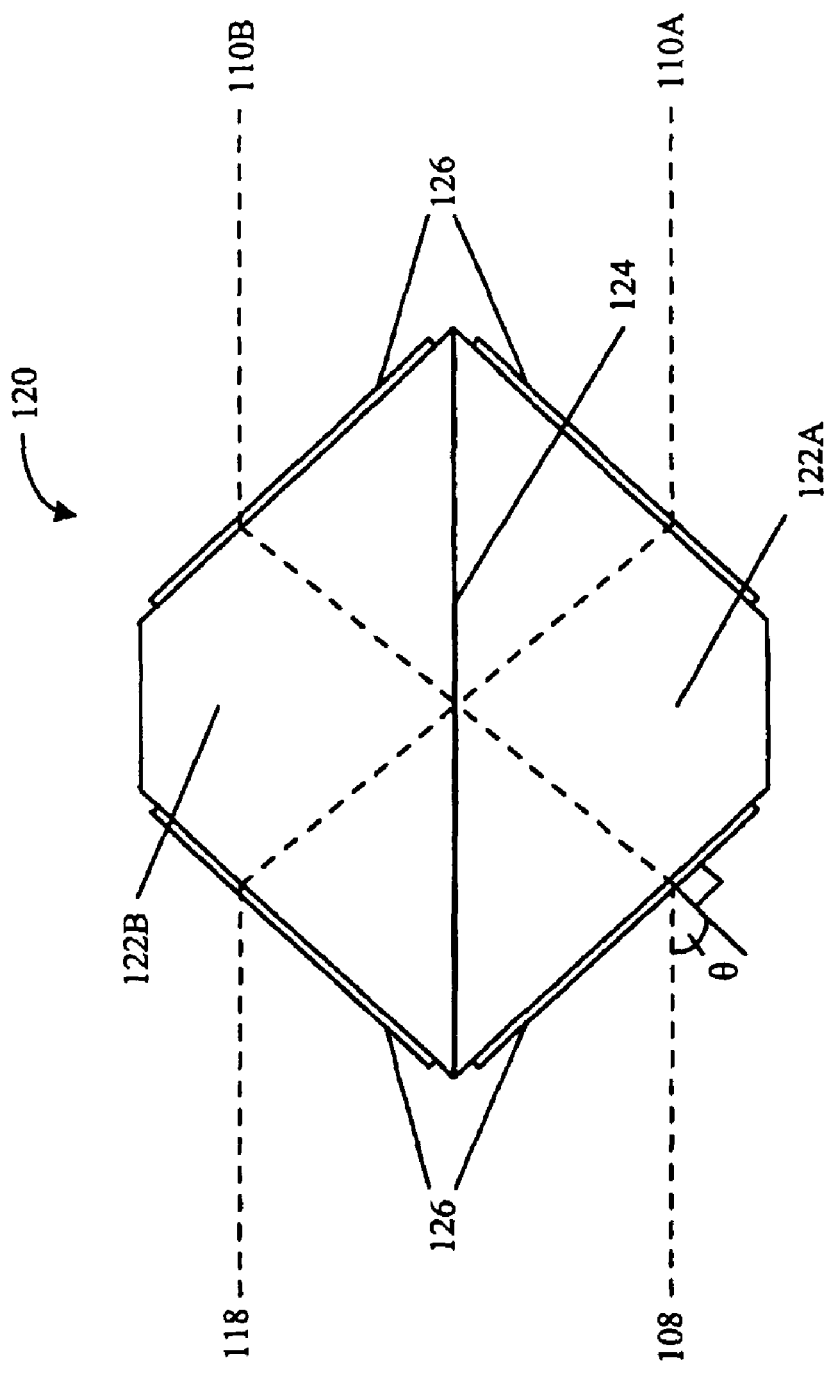
FIG. 2 shows an embodiment of a polarizing beam splitter of the present invention.

FIG. 2 shows an embodiment of polarizing beam splitter 120 of the present invention that may be used as either one or both of the beam directors 102, 104 of FIG. 1. The polarizing beam splitter 120 includes a first isotropic piece 122A and a second isotropic piece 122B that sandwiches a layer of anisotropic material 124. The isotropic pieces 122A, 122B (or isotropic prisms since they refract light) can be made from any isotropic material including glass and plastic. The anisotropic layer 124 can be made of any anisotropic material provided the isotropic pieces 122A, 122B and the anisotropic layer 124 function to separate light beams 108, 118 into two light beams 110A, 110B of orthogonal polarization. For example, the anisotropic layer 124 can be a highly birefringent nematic liquid crystal with homeotropic alignment in a zero-twist configuration. The molecular directors should all be aligned normal to the light beams 108, 118 and parallel to the interface between the isotropic and anisotropic materials (i.e., the molecular directors should be aligned parallel to the cross of the light beams). The extraordinary index of refraction of the liquid crystal ($n_e$) should match the index of refraction of the isotropic pieces ($n_{iso}$) in order to allow transmission of the s-polarization portion of the light beams 108, 118 with minimal Fresnel loss. Total internal reflection of the p-polarization portion of the light beams 108, 118 occurs due to the acute angle of incidence of the light beams 108, 118 and the large refractive index mismatch between $n_{iso}$ and the ordinary index of refraction of the liquid crystal ($n_o$). Alternatively, the p-polarization portion could be transmitted and the s-polarization portion reflected by matching $n_o$ and $n_{iso}$ where $n_e < n_o$ instead of matching $n_e$ and $n_{iso}$. In either case, the thickness of the anisotropic layer 124 should be large enough to avoid tunneling of the light of the polarization that is to be reflected.

Optical films 126 can be formed at the input and output points of the polarization beam splitter 120. These optical films 126 ensure the substantial coupling of both the s and p polarized light components into and out of the polarizing beam splitter 120. Thus, enabling equal portions of s and p polarized light to be coupled in and out of the polarizing beam splitter 120 at larger acute angles (e.g., about 49°). The thickness and index of refraction of the optical films 126 can be determined using a constrained least squares optimization method or another method. The optical films can be formed using conventional anti-reflection film deposition techniques.

Additionally, the interfaces between the isotropic pieces 122A, 122B and the anisotropic material 124 could include an optical transition film (not shown) when the $n_{iso}$, cannot be exactly matched to an index of refraction of the anisotropic layer 124. The optical transition film would have an index of refraction selected to better transmit the light of the polarization to be transmitted (e.g., the index of refraction of the transition film being between $n_{iso}$ and the "matched" index of refraction of the anisotropic layer 124). The optical transition film also must continue to reflect light of the polarization to be reflected (e.g., the difference between the index of refraction of the transition film and the "unmatched" index of refraction being sufficiently large).

Alternatively, the transition film could be formed from multiple layers instead of a single layer.

Figure 3:
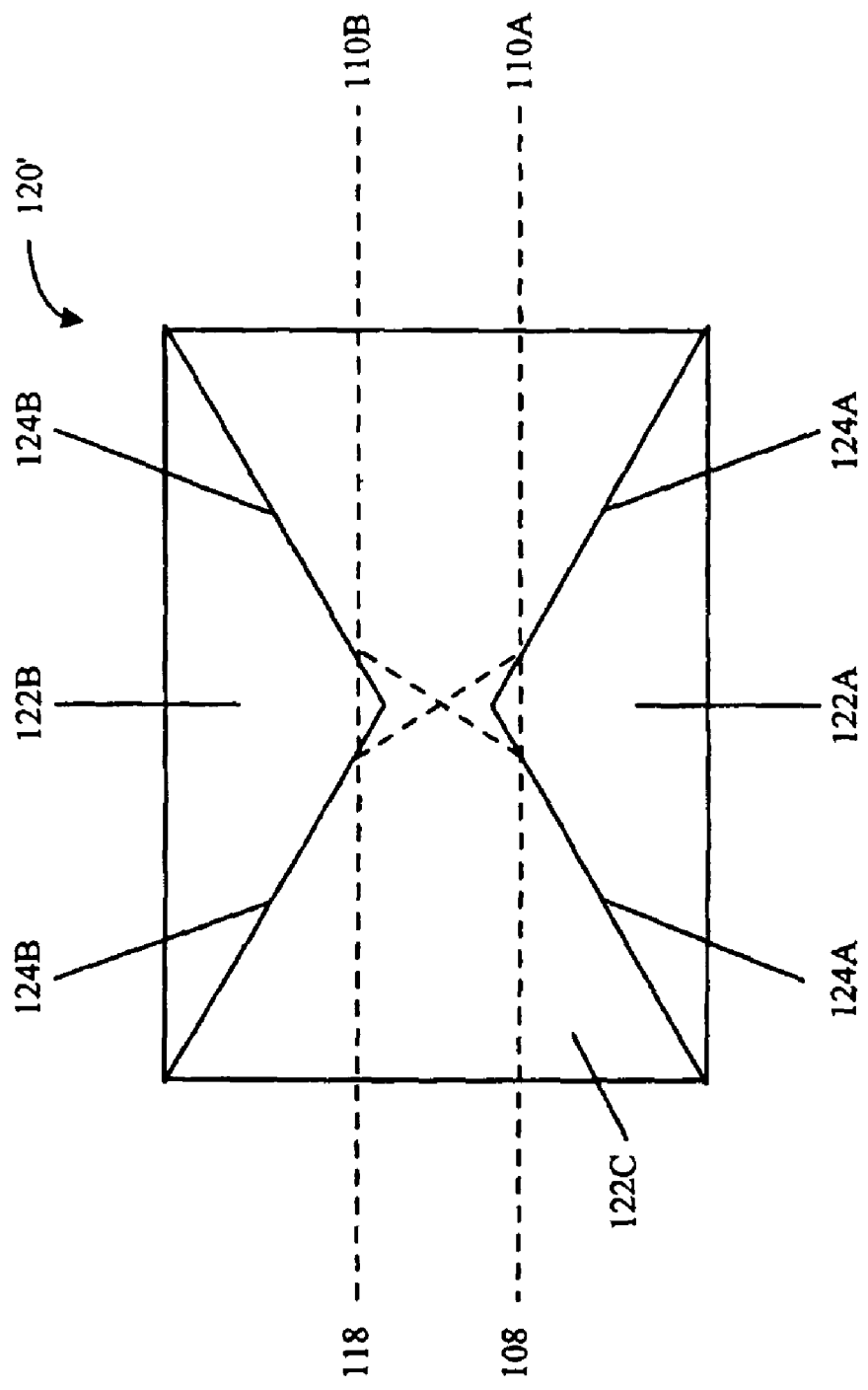
FIG. 3 shows another embodiment of polarizing beam splitter of the present invention.

FIG. 3 shows another embodiment of polarizing beam splitter 120' of the present invention that may be used as either one or both of the beam directors 102, 104 of FIG. 1. The polarizing beam splitter 120' has two isotropic/anisotropic interfaces. The first isotropic/anisotropic interface includes a first isotropic piece 122A and an isotropic bow-tie portion 122C that sandwiches anisotropic material 124A along two sides of the first isotropic piece 122A. The second isotropic/anisotropic interface includes a second isotropic piece 122B and the isotropic bow-tie portion 122C that sandwiches anisotropic material 124B along two sides of the second isotropic piece 122B. The isotropic pieces 122A, 122B and the bow-tie portion 122C can be made from any isotropic material including glass and plastic. The anisotropic material 124A, 124B can be made of any isotropic material provided the isotropic pieces 122A, 122B and the isotropic bow-tie portion 122C in combination with the anisotropic material 124A, 124B functions to separate the light beams 108, 118 into two light beams 110A, 110B of orthogonal polarization. For example, the anisotropic material 124A, 124B can be a highly birefringent nematic liquid crystal with homeotropic alignment in a zero-twist configuration. The molecular directors should all be aligned normal to the light beams 108, 118 and parallel to the interfaces between the isotropic and anisotropic materials (i.e., the molecular directors should be aligned parallel to the cross of the light beams). The extraordinary index of refraction of the liquid crystal ($n_e$) should match the index of refraction of the isotropic pieces and bow-tie portion ($n_{iso}$) in order to allow transmission of the s-polarization portion of the light beams 108, 118 with minimal Fresnel loss. Total internal reflection of the p-polarization portion of the light beams 108, 118 occurs due to the acute angle of incidence of the light beams 108, 118 and the large refractive index mismatch between $n_{iso}$ and the ordinary index of refraction of the liquid crystal ($n_o$). Alternatively, the p-polarization portion could be transmitted and the s-polarization portion reflected by matching $n_o$ and $n_{iso}$ instead of matching $n_e$ and $n_{iso}$. In either case, the thickness of the anisotropic layer 124 should be large enough to avoid tunneling of the light of the polarization that is to be reflected. The isolation between orthogonal polarization components for the polarization beam splitter 120' of FIG. 3 is approximately twice that of the polarization beam splitter 120 of FIG. 2 because the light beams 108, 118 must pass through or be reflected twice during transit through the polarizing beam splitter 120'.

Additionally, the interfaces between the anisotropic material 124A, 124B and any of the isotropic pieces 122A, 122B and the isotropic bow-tie portion 124C could include an optical transition film (not shown) when the $n_{iso}$ cannot be exactly matched to an index of refraction of the anisotropic material 124A, 124B. The optical transition film would have an index of refraction selected to better transmit the light of the polarization to be transmitted (e.g., the index of refraction of the transition film being between $n_{iso}$ and the "matched" index of refraction of the anisotropic layer 124). The optical transition film also must continue to reflect light of the polarization to be reflected (e.g., the difference between the index of refraction of the transition film and the "unmatched" index of refraction being sufficiently large). Alternatively, the transition film could be formed from multiple layers instead of a single layer. The light throughput may be further increase by including conventional anti-reflective films at the input and exit surfaces of the polarizing beam splitter 120'.

Figure 4:
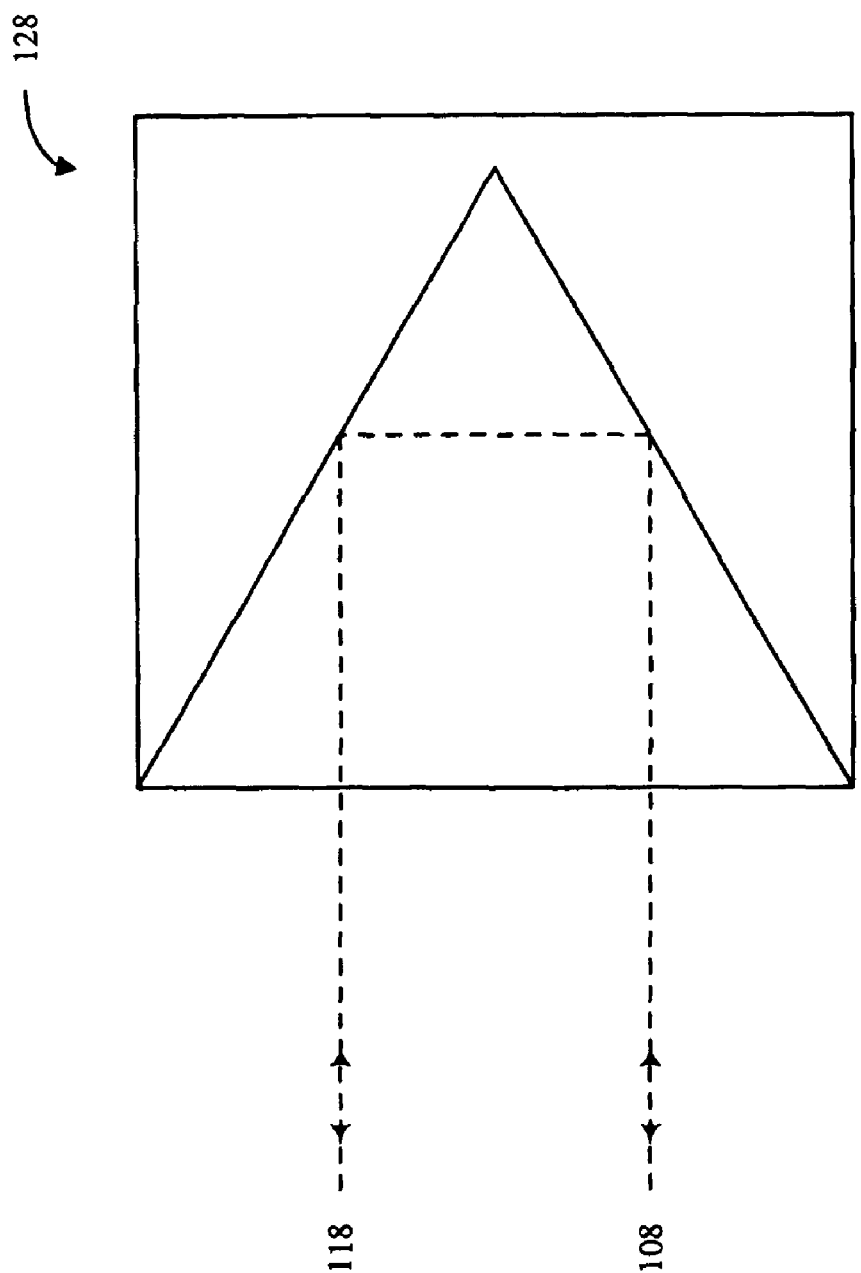
FIG. 4 shows a cube reflector.

FIG. 4 shows a cube reflector 128 that may be used as the second beam director 104 of FIG. 1. The cube reflector 128 reflects received light from one path and reflects it along the other path. A plane mirror or a retro-reflector may be used to reflect received light back along the same path. Other types of reflectors may also be used as the second beam director 104 and the reflector may also be couple with other elements.

Figure 5:
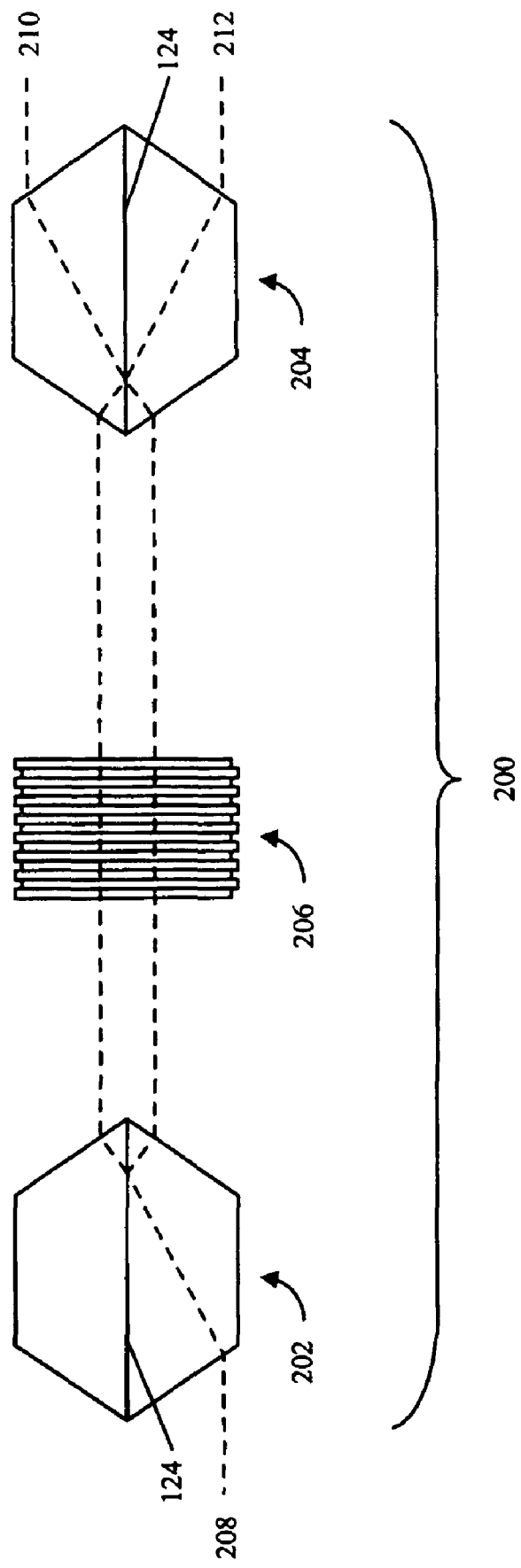
FIG. 5 shows a three-port birefringent network.

FIG. 5 shows a three-port birefringent network 200 according to the present invention. The three-port network 200 includes a first polarizing beam splitter 202, a second polarizing beam splitter 204 and a birefringent filter 206. The three-port birefringent network 200 can be used to separate a COMMON light beam 208 that is input into the three-port birefringent network 200 into a first light beam 210 with one sub-set of frequencies and a second light beam 212 with another sub-set of frequencies. Conversely, the three-port birefringent network 200 can be used to combine a first light beam 208 with one sub-set of frequencies and a second light beam 212 with another sub-set of frequencies into a COMMON light beam 200 by reversing the direction of light flow.

The COMMON light beam 208 enters the first beam splitter 202 parallel to the plane of its anisotropic layer 124 and the two separated and polarized components of the COMMON light beam 208 exit parallel to the COMMON light beam 208. The two components remain parallel to the COMMON light beam 208 during transit through the birefringent filter 206 and enter the second beam splitter 204 parallel its anisotropic layer 124. The first and second light beams 210, 212 are then output from second beam splitter 204 parallel to the COMMON light beam 208. Accordingly, the light that enters and exits the polarizing beam splitters 202, 204 is all parallel. Additionally, the anisotropic layers 124 of the polarizing beam splitters 202, 204 also are parallel to the light that enters and exits the polarizing beam splitters 202, 204.

Figure 6:
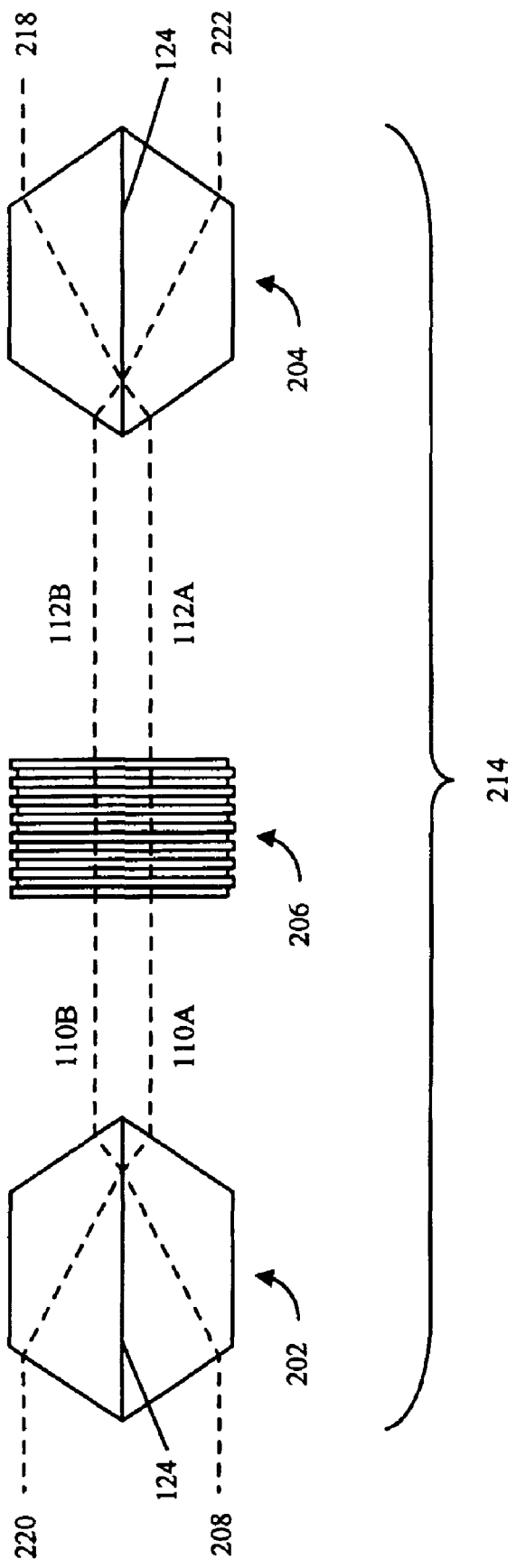
FIG. 6 shows an add-drop birefringent network.

FIG. 6 shows an add-drop birefringent network 214 according to the present invention. The add-drop birefringent network 214 is structurally the same as the three-port birefringent network 200 of FIG. 5 except for the inclusion of another input light beam. The add-drop birefringent network 214 can be used to separate out a sub-set of frequencies from an input light beam 216 into a DROP light beam 218. The birefringent network 214 then combines the sub-set of frequencies that remain from the INPUT light beam 216 with an ADD light beam 220 to form a THRU light beam 222.

The INPUT light beam 216 enters the first beam splitter 202 parallel to the plane of its anisotropic layer 124 and the two separated and polarized components of the INPUT light beam 216 exit parallel to the INPUT light beam 216. The two components remain parallel to the INPUT light beam 216 during transit through the birefringent filter 206 and enter the second beam splitter 204 parallel its anisotropic layer 124. The ADD and DROP light beams 218, 222 are then output from second beam splitter 204 parallel to the INPUT light beam 216.

Similarly, the ADD light beam 220 enters the first beam splitter 202 parallel to the plane of its anisotropic layer 124 and the two separated and polarized components of the ADD light beam 220 exit parallel to the ADD light beam 220. The two components remain parallel to the ADD light beam 220 during transit through the birefringent filter 206 and enter the second beam splitter 204 parallel its anisotropic layer 124. The ADD and DROP light beams 218, 222 are then output from second beam splitter 204 parallel to the INPUT light beam 216. Accordingly, the light that enters and exits the polarizing beam splitters 202, 204 is all parallel. Additionally, the anisotropic layers 124 of the polarizing beam splitters 202, 204 also are parallel to the light that enters and exits the polarizing beam splitters 202, 204.

Figure 7:
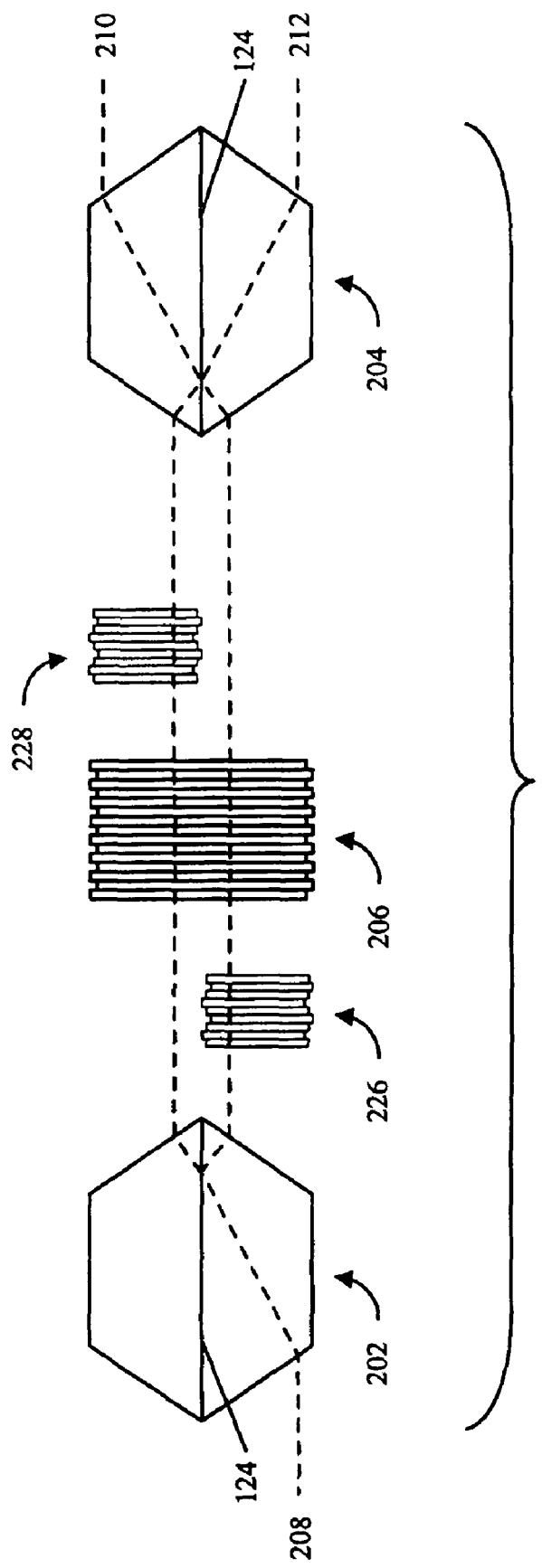
FIG. 7 shows a three-port birefringent network including achromatic compensation elements.

FIG. 7 shows a three-port birefringent network 224 including first and second achromatic compensation elements 226, 228. The three-port birefringent network 224 of FIG. 7 is structurally the same as the three-port birefringent network 200 of FIG. 5 except for the addition of the two achromatic compensation elements 226, 228. The first achromatic compensation element 226 is placed in a first path on one side of the birefringent filter 206 and the second achromatic compensation element 228 is placed in a second path on the other side of the birefringent filter 208. Each achromatic compensation element 226, 228 is formed from a stack of birefringent plates. The birefringent plates are oriented and have an optical thickness ($\Delta n \cdot d$) designed to produce an achromatic rotation of 90° (an achromatic half waveplate). The 90° rotation introduced by the first achromatic compensation element 226 changes the orthogonal polarization relationship of the light beams output by the first beam splitter 202 into a parallel polarization relationship. The parallel relationship of the light input into the birefringent filter 206 ensures that the same group delay affects both light beams and no PMD dispersion. The second compensation element 228 recreates the orthogonal polarization relationship between the two light beams and equalizes the optical path lengths of the first and second paths. The polarization reversal causes the output from the second polarization beam splitter 204 to act in a reversed manner (i.e., light that would have been reflected is now transmitted and light that would have been transmitted is not reflected).

Figure 8:
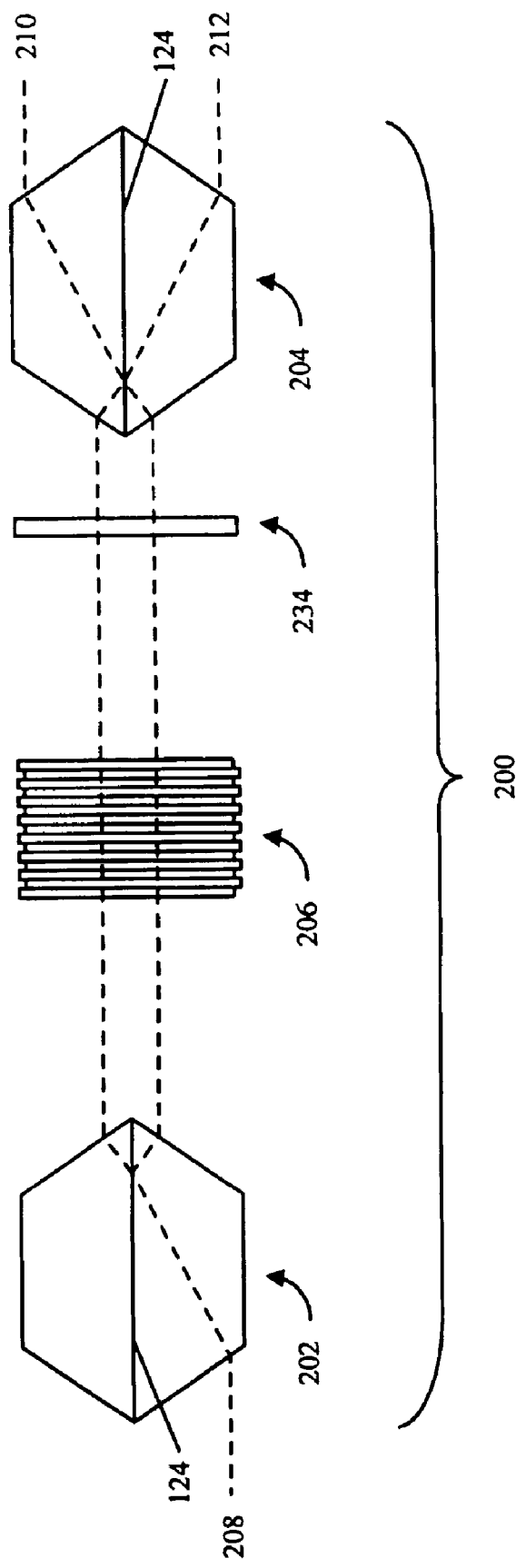
FIG. 8 shows a three port birefringent network with an active switching element.
Figure 9:
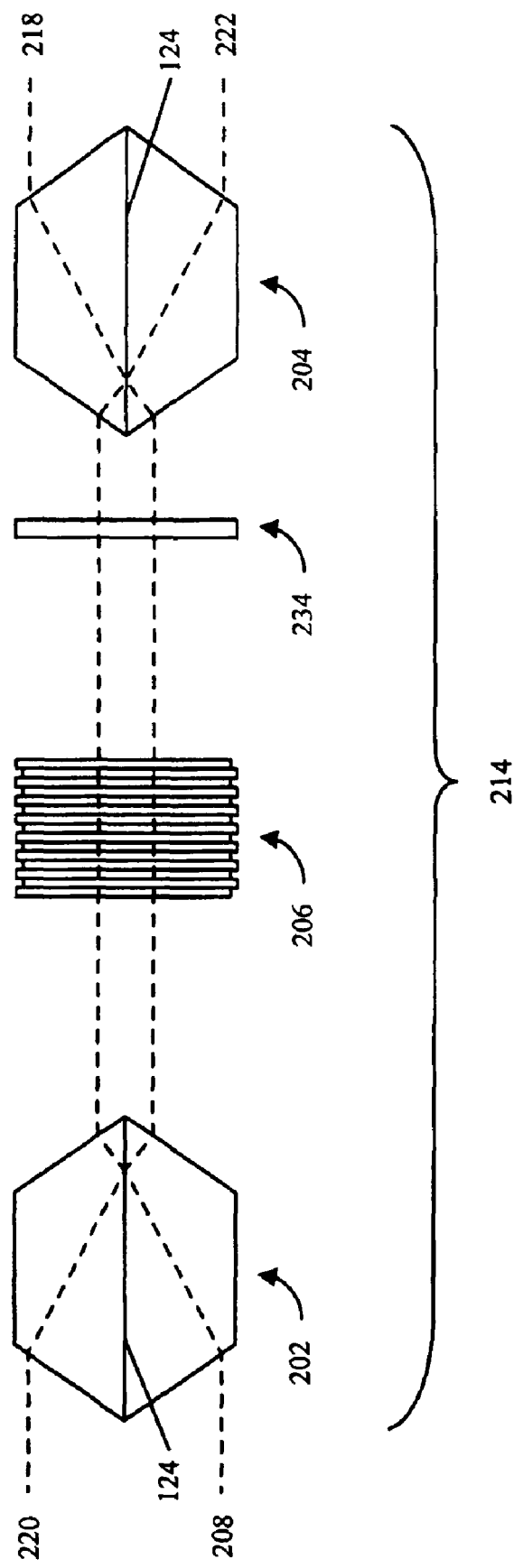
FIG. 9 shows a three-port birefringent network including achromatic compensation elements with an active switching element.
Figure 10:
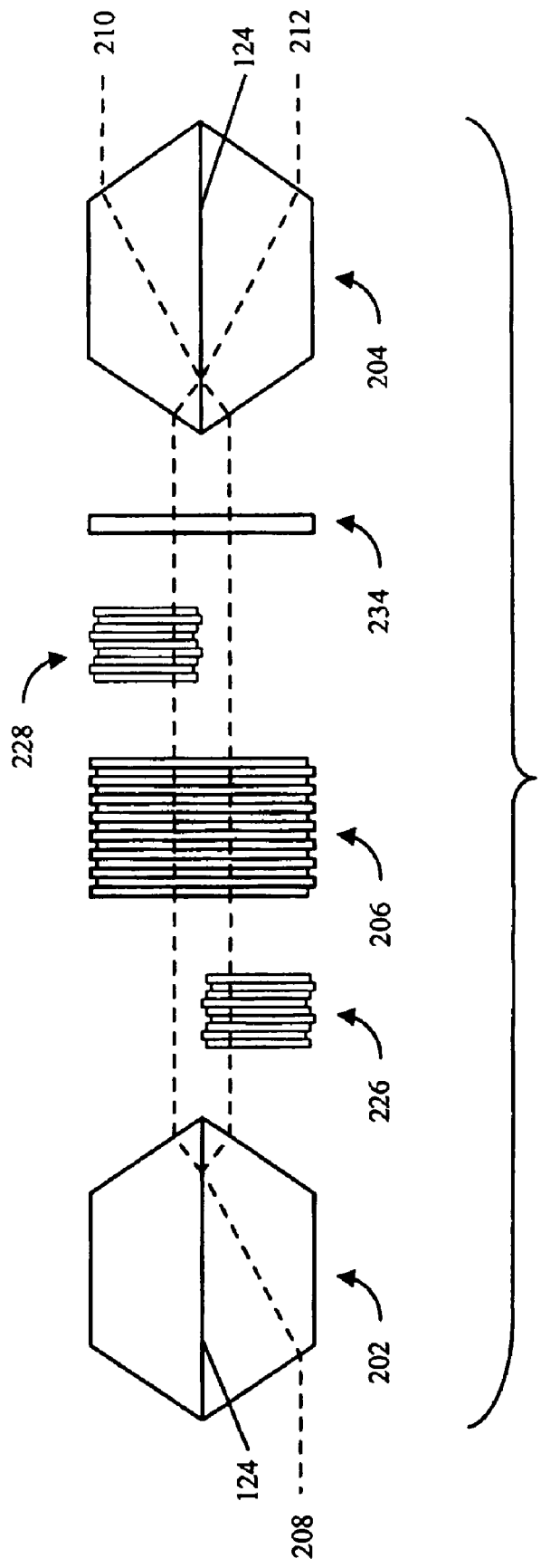
FIG. 10 shows a three-port birefringent network including achromatic compensation elements and an active switching element.

FIGS. 8–10 essentially are the birefringent networks of FIGS. 5–7 with active switching. The active switching is performed by an active switching element 134 such as a liquid crystal cell. The active switching element 134 can provide 90° of rotation to the light in the first and second paths simultaneously (i.e., a single pixel active switching element) or the active switching element 134 can provide 90° of rotation to the light in one or both of the first and second paths (i.e., a two pixel active switching element). The single pixel active switching element is advantageous in that it has a simple structure while the two pixel active switching element provides independent control over the light in each path.

In FIGS. 8 and 10, the single pixel embodiment of the active switching element 134 enables the transposition of light directed into the first and second light beams 210, 212. The two pixel embodiment of the active switching element 134 enables the independent control of light directed into the first and second beams 210, 212. Specifically, the active birefringent network directs the light normally when both pixels are "off" (no rotation of the polarization of the light). All of the light of one polarization is directed to one of the two light paths 210, 212 and all of the light of the orthogonal polarization is directed to the other of the two light paths 210, 212 when one pixel is turned "on" (a half wave rotation of the polarization of the light) and one pixel is turned "off". Reversing which pixel is "on" and which pixel is "off" reverses which polarization is directed into each of the two light beams 210, 212. The light beam to which light is directed is transposed as compare to a passive device when both pixels are "on". However, FIGS. 8 and 10 differ in that the achromatic compensation elements 226, 228 of FIG. 10 reverse the polarizations that are output into the first and second light beams 210, 212 as compare to FIG. 8.

In FIG. 9., the single pixel embodiment of the active switching element 134 enables the transposition of light directed into the DROP and THRU light beams 218, 222. The two pixel embodiment of the active switching element 134 enables the independent control of light directed into the DROP and THRU light beams 218, 222. Specifically, the active birefringent network directs the light normally when both pixels are "off" (no rotation of the polarization of the light). All of the light of one polarization from the INPUT light beam 216 is directed to one of the DROP and THRU light paths 218, 222 and all of the light of the orthogonal polarization from the INPUT light beam 216 is directed to the other of the DROP and THRU light paths 218, 222 when one pixel is turned "on" (a half wave rotation of the polarization of the light) and one pixel is turned "off". All of the light of the orthogonal polarization from the ADD light beam 220 is directed to the one of the DROP and THRU light paths 218, 222 and all of the light of the one polarization from the ADD light beam 220 is directed to the other of the DROP and THRU light paths 218, 222 when one pixel is turned "on" (a half wave rotation of the polarization of the light) and one pixel is turned "off". Reversing which pixel is "on" and which pixel is "off" reverses which polarizations are directed into the DROP and THRU light paths 218, 222. The light path to which light is directed is transposed as compare to passive device when both pixels are "on".

Figure 11:
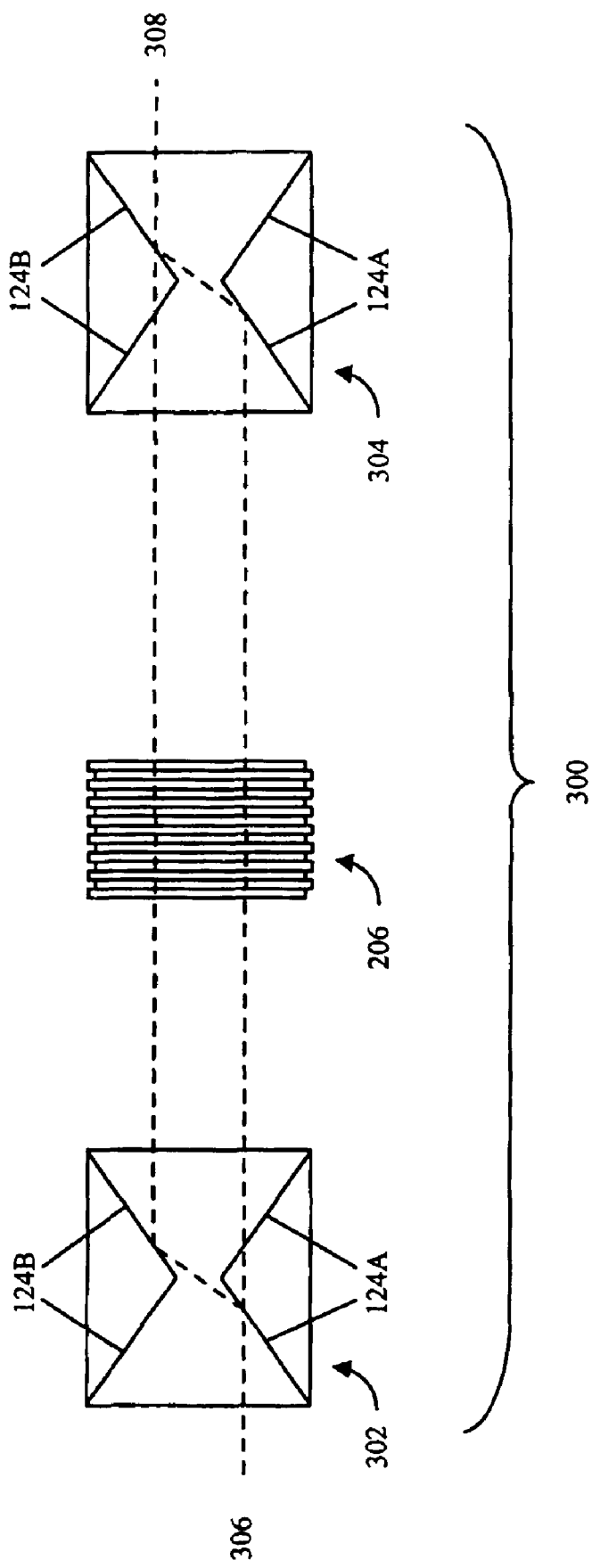
FIG. 11 shows a two-port birefringent network using the beam directors of FIG. 3.

FIG. 11 shows a two-port birefringent network 300 according to the present invention. The two-port network 300 includes a first polarizing beam splitter 302, a second polarizing beam splitter 304 and a birefringent filter 206. The reflected light travels farther than the transmitted light in each of the polarizing beam splitters 302 because it is reflected twice. This results in an asymmetry in the birefringent network 300 that is not present in the birefringent networks of FIGS. 5–10. Thus, the second polarizing beam splitter 304 is selected to internally reflect light transmitted through polarizing beam splitter 302 and to transmit light reflected in polarizing beam splitter 302 (e.g., the first polarizing beam splitter 302 transmits incident s-polarized light and twice reflects incident p-polarized light while the second polarizing beam splitter 304 transmits incident p-polarized light and twice reflects incident s-polarized light). The opposing asymmetries of the two polarizing beam splitters 302, 304 cause all input light 306 traveling through the two-port birefringent network 300 to traverse equal the path lengths before being output as filtered light 308. It is also possible to make both polarizing beam splitters 302, 304 of identical construction by including an achromatic half waveplate (not shown) between the polarizing beam splitters 302, 304.

Figure 12:
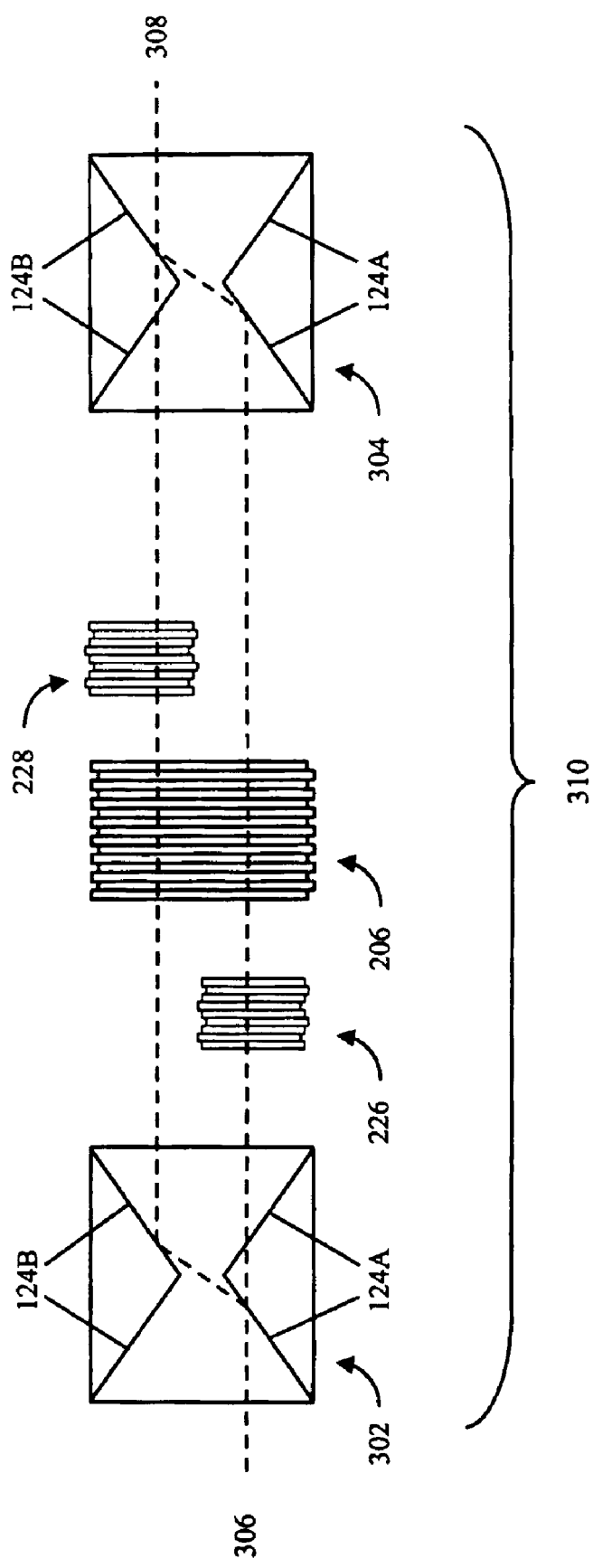
FIG. 12 shows a two-port birefringent network of FIG. 11 with achromatic compensation elements.

FIG. 12 shows a two-port birefringent network 310 according to the present invention that includes achromatic compensation. The two-port network 310 includes all of the elements of the two-port network 300 of FIG. 11 and additionally includes a first achromatic compensation element 226 and a second achromatic compensation element 228. The achromatic elements 226, 228 function in the manner described above with regard to FIG. 7. However, the 90° rotation introduced by the achromatic elements 226, 228 advantageously allows both polarization beam splitters 302, 304 to be of identical construction without additional elements.

Figure 13:
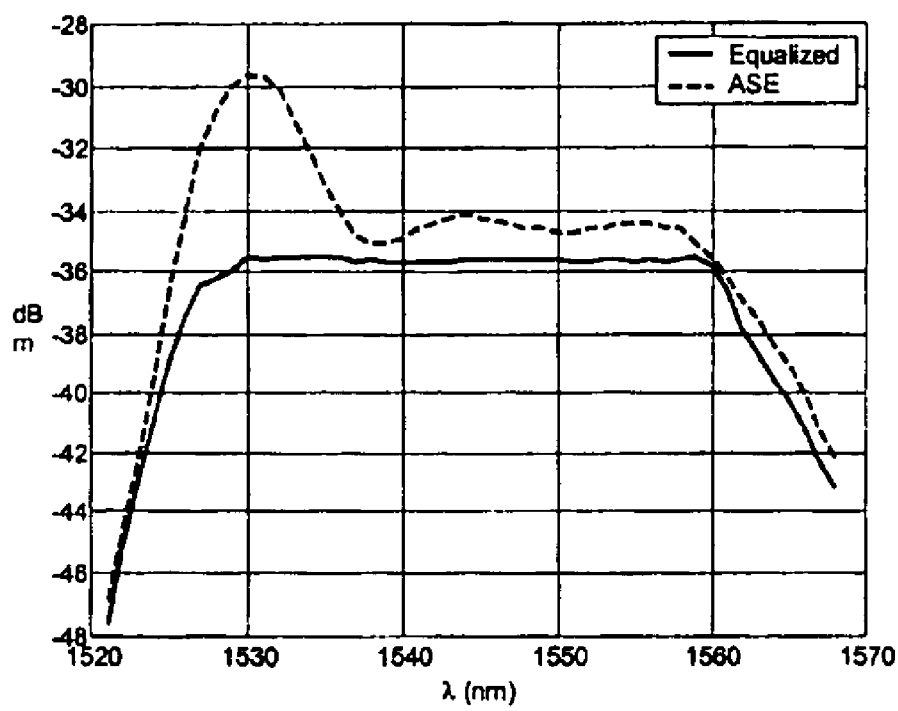
FIG. 13 is a plot of a computer simulation of a gain flattening filter implemented with a two-port birefringent network.

FIG. 13 is a plot of a computer simulation of a gain flattening filter implemented with a two-port birefringent network. The gain flattening filter helps equalize the amount of power in each channel and/or frequency. The two-port birefringent network is constructed substantially as shown in FIG. 5.

Figure 14:
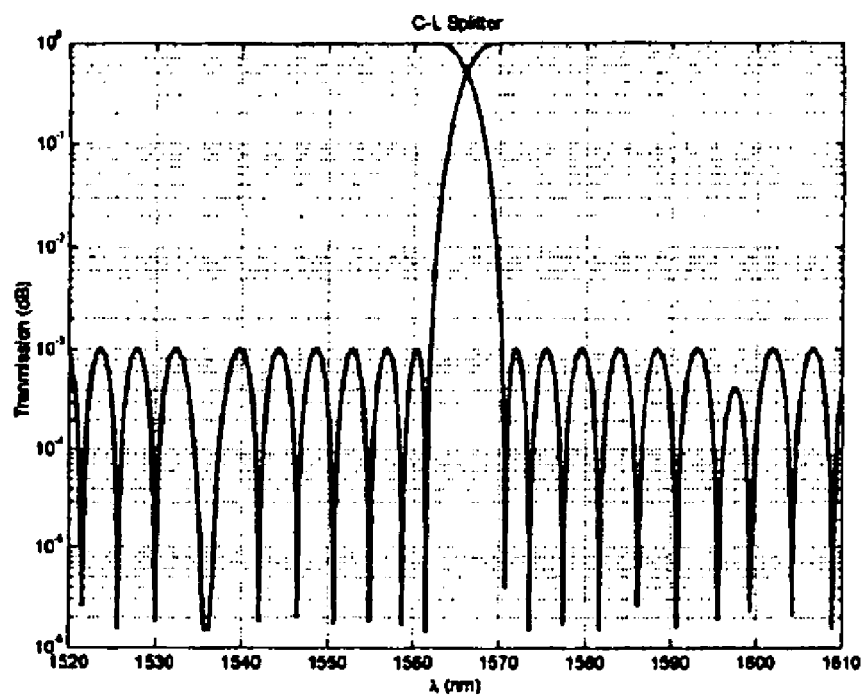
FIG. 14 is a plot of a simulation of a broadband filter implemented with a three-port birefringent network.

FIG. 14 is a plot of a simulation of a broadband filter implemented with a three-port birefringent network. The three-port birefringent network is constructed substantially as shown in FIG. 5.

FIG. 15 shows a walk-off configured birefringent network 400 according to the present invention. The walk-off configured birefringent network 400 includes a first bulk birefringent beam splitter 402, a second bulk birefringent beam splitter 404 and a birefringent filter 206. The first bulk birefringent beam splitter 402 divides an input beam 406 into two light beams 408, 410 of orthogonal orientations that are then filtered by the birefringent filter 206. The filtered light beams 412, 414 are each divided into two separate light beams. The top light beam 416 travels farther than any other light beam because it is walked-off twice. The bottom light beam 418 travels less distance than any other light beam because it is never walked-off. The middle light beam 420 is composed of parts of both of the light beams 408, 410 output from the first bulk birefringent. The light of the middle light beam 420 has all traveled about the same distance since both components of the middle light beam 420 are walked-off once. (The first bulk birefringent beam splitter 402 has the same thickness as the second bulk birefringent beam splitter 404.) The top light beam 416 and the bottom light beam are both polarized and the middle light beam 414 is unpolarized. The simple geometry and small spacing of the light beams reduces the cost because smaller bulk polarization beam splitters may be used.

The birefringent networks of the present invention may be constructed as various kinds of single stage two-port, three-port and four-port birefringent networks. For example, the birefringent networks discussed herein can be used as wavelength division multiplexers, interleavers, dispersion compensators, wavelength selective switches (e.g., 2×2) or rotators. The birefringent networks of the present invention also may be cascaded to form more complex devices. The birefringent filters described herein can be any kind of birefringent filter. For example, the birefringent filters could be retarder stacks, bulk birefringent materials or liquid crystal devices.

As used herein, the word "redirect", "redirected" and "redirecting" should be understood to be distinguished from "transmit", "transmitted" and "transmitting". For example, light normally incident upon a cube beam splitter separates the light into two orthogonal beams. One beam is reflected perpendicular to the incident light direction and the other beam continues to travel parallel to the incident light direction. Both beams are transmitted though the cube beam splitter but only the reflected beam is redirected by the beam splitter. The cause (e.g., reflection, refraction, etc.) of the redirection is not relevant to the term. These terms should otherwise be broadly interpreted.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

We claim:

1. A birefringent network comprising:
a first beam director that redirects light into a first path and a second path;
a second director that receives light directed along the first and second paths; and
a birefringent filter between the first and second beam directors that filters the light which traverses along the first and second paths;
wherein the length of the first path is substantially equal to the length of the second path; and
wherein the optical length of the first path is substantially equal to the optical length of the second path.

2. The network of claim 1, wherein:
the first beam director includes a media and a film located at a surface of the media; and
the film couples at least two predetermined orthogonal polarization components of an acute incident light into the media.

3. The network of claim 2, wherein a film thickness and a film index of refraction of the film are selected to couple substantial portions of the at least two predetermined orthogonal polarization components into the media.

4. The network of claim 1, wherein the film has at least two layers, each layer having a thickness and refractive index selected couple substantial portions of the at least two predetermined orthogonal polarization components into the media.

5. The network of claim 1, wherein the first director is a polarizing beam splitter.

6. The network of claim 5, wherein the polarizing beam splitter is part of a birefringent network.

7. The network of claim 6, wherein the birefringent network is one of a wavelength division modulator, an interleaver, a dispersion compensator, and a switch.

8. The network of claim 6, wherein the birefringent network is 2×2 switch.

9. The network of claim 1, wherein light input into the birefringent network travels parallel to light output by the birefringent network.

10. The network of claim 9, wherein light travelling through the birefringent filter is parallel to the light input into the birefringent network.

11. The network of claim 1, wherein light is incident upon the first beam director at two different points.

12. The network of claim 11, wherein light output by the second beam director is output at two different points.

13. The network of claim 1, wherein light output by the second beam director is output at two different points.

14. The network of claim 1, further comprising:
a first achromatic compensation element in the first path; and
a second achromatic compensation element in the second path.

15. The network of claim 1, further comprising an active element between the first beam director and the second beam director for selectively altering at least one characteristic of light.

16. The network of claim 15, wherein the active element can simultaneously alter the at least one characteristic of light for the light traveling along the first and second paths.

17. The network of claim 15, wherein the active element can independently alter the at least one characteristic of light for the light traveling along each of the first and second paths.

18. The network of claim 1, wherein the first and second beam directors have the same configuration.

19. The network of claim 18, wherein each beam director comprises first and second isotropic media sandwiching an anisotropic media.

20. The network of claim 19, wherein the anisotropic media allows transmission of light of one polarization and causes reflection of light of an orthogonal orientation to the one polarization.

21. The network of claim 19, wherein the anisotropic media is a homeotropically aligned zero-twist nematic liquid crystal.

22. The network of claim 18, wherein each beam director includes first and second isotropic media sandwiching an anisotropic media along a sandwiching direction such that light input into and output from each beam director are parallel to the sandwiching direction.

23. The network of claim 1, wherein light received by the second beam director from the first and second paths is caused to be output from the second beam director back towards the first beam director along the first and second paths.

24. The network of claim 23, wherein the second beam director is a reflector.

25. The network of claim 1, wherein the first beam director, the second beam director and the birefringent filter are a passive network.

26. The network of claim 25, wherein the passive network is able to separate a predetermined optical signal from a plurality of optical signals contained within light received by the passive network.

27. The network of claim 25, wherein the passive network is able to integrate an optical signal into light output by the passive network.

28. The network of claim 25, wherein:

the passive network is able to separate a desired optical signal from a plurality of optical signals contained within light received by the passive network; and the passive network is able to integrate a different optical signal into light output by the passive network.

29. The network of claim 1, wherein:

the first beam director includes two first isotropic/anisotropic interfaces, the first isotropic/anisotropic interfaces transmitting light of one polarization state and reflecting light of an orthogonal polarization state; and the second beam director includes two first isotropic/anisotropic interfaces, the first isotropic/anisotropic interfaces transmitting light of the orthogonal polarization state and reflecting light of the one polarization state.

* * * * *